Figure 1:
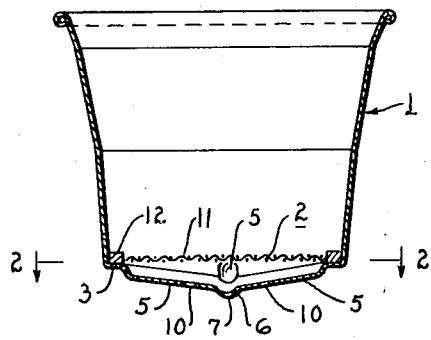

April 24, 1956 F. A. STIGLITZ 2,742,849

DEVICE FOR MAKING COFFEE

Filed Nov. 26, 1954

INVENTOR.
FLORENCE A. STIGLITZ
BY
Charles S. Penfold
ATTORNEY

United States Patent Office 2,742,849
Patented Apr. 24, 1956

2,742,849
DEVICE FOR MAKING COFFEE
Florence A. Stiglitz, Gary, Ind.
Application November 26, 1954, Serial No. 471,314
3 Claims. (Cl. 99—299)

This invention relates generally to equipment employed in a kitchen and more particularly is directed to a device which is primarily adapted for use with a coffee urn, although it has also proven successful in the preparation of rice, soups, stews, and the like.

One of the conventional methods of preparing coffee in urns of large capacity involves the use of a cloth bag. these bags become stained and unsightly in appearance and one always wonders whether a bag has been thoroughly sanitized before each batch of coffee is made. Furthermore, after a relatively short period the cloth will either become clogged or sour, if not properly cleaned. Moreover, the cleaning of such bags is usually a messy job.

With the foregoing in mind, one of the important objects of the invention is to avoid the disadvantages associated with the use of a cloth bag and utilize as a substitute therefor a novel assembly or device comprising a container of a particular character and a strainer operatively connected with the container.

More specifically, the device comprises a container having a cylindrical side wall and a dished or generally concave bottom wall supporting the strainer, and in which the bottom wall is provided with a centrally disposed aperture and a plurality of grooves or channel formations leading to the aperture for the purpose of promoting or facilitating the flow of the commodity to the aperture after straining.

Another object of the invention is to provide an assembly in which the container is tapered so as to facilitate its disposition in supports of different cross-sectional dimensions.

A significant object of the invention is to provide a container in which the bottom wall thereof is provided with an annular rest portion upon which the strainer bears and a dished round portion offset from the rest portion so that the dished portion is spaced from and below the strainer for clearance in order that the commodity will readily flow into the center aperture by way of the grooves or portions of the bottom wall between these grooves.

A specific object of the invention is to provide a container having a bottom wall in which the grooves impart stability or rigidity to the wall.

A further object of the invention is to provide the rest portion with a small hole so that a tool can be inserted therethrough to unseat the strainer and thereby permit its removal from the container.

Additional attributes of the assembly reside in its simplicity of design and construction, economy of manufacture, durability, ease in manipulation and cleaning, and efficiency in operation.

Other objects and advantages of the invention will become apparent after the description hereinafter set forth is considered in conjunction with the drawings annexed hereto.

Figure 2:
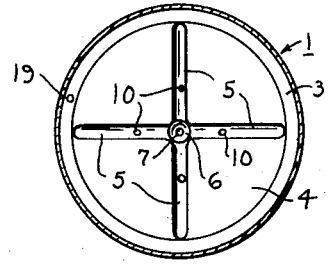
Figure 3:
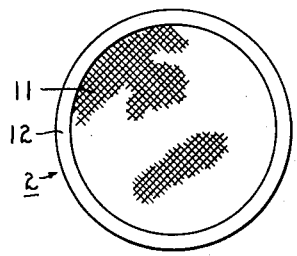
Figure 5:
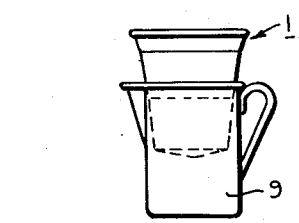
Figure 4:
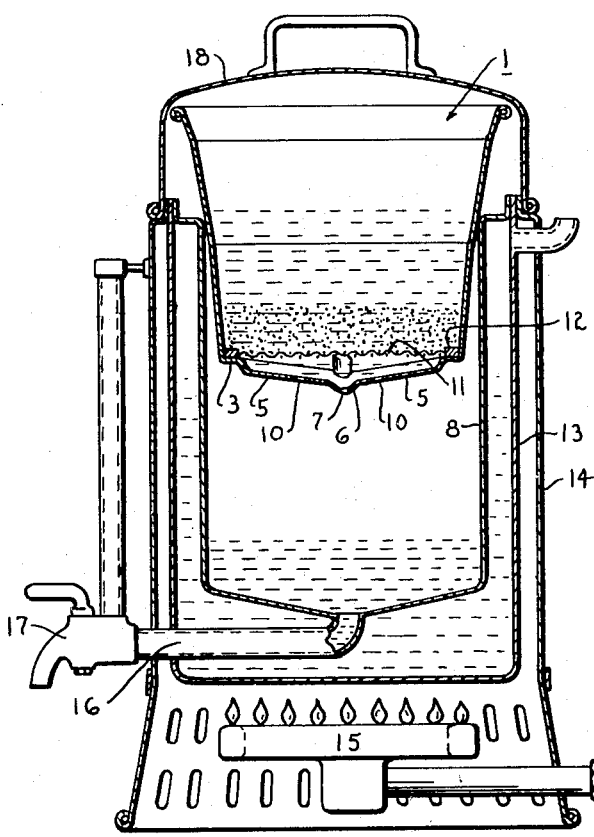

In the drawings:
Figure 1 is a vertical section of the assembly;
Figure 2 is a transverse section taken substantially on line 2—2 of Figure 1 showing the character of the bottom wall of the container;
Figure 3 is a top view of the strainer;
Figure 4 is a vertical section of an urn with the assembly supported therein; and
Figure 5 is an elevational view showing the assembly supported in a vessel, such as a pitcher.

As clearly exemplified in the drawing, the assembly comprises a container generally designated 1 and a strainer generally designated 2.

The container is preferably tapered and quite deep and includes a cylindrical side wall and a bottom wall. The bottom wall is formed with an annular horizontal rest portion 3 extending inwardly from the side wall. The bottom wall also includes a dished or concave portion 4 preferably provided with four radial grooves 5 or channel formations which intersect with a centrally disposed pocket 6 having an aperture 7 therein through which the strained commodity may pass into a reservoir 8 for the commodity as shown in Figure 4 or other vessel, such as the pitcher 9 depicted in Figure 5. It will be noted that the grooves are equally spaced apart, and that the base portion of each groove is preferably provided with a small hole 10 to further assist in promoting the flow of liquid from the container into the reservoir. The holes are all equally spaced from the center aperture and approximately midway of the grooves.

The strainer is comprised of a round flat piece of screen 11, the peripheral edge portion of which is secured to an annulus or ring 12. As illustrated in Figures 1 and 4, the annulus is of a size to snugly fit in the container and engage or bear against the rest portion 3 thereof for support and so that the screen is disposed only over the dished portion of the bottom wall of the container.

Referring more particularly to the structure illustrated in Figure 4 of the drawing, the reservoir 8 is disposed within a boiler 13 which in turn is supported in a housing 14. The reservoir, boiler and housing are cylindrical in shape and arranged in concentric relation with one another. A gas heater 15 is located in the lower part of the housing for heating water in the boiler to brew and maintain the coffee in the container and/or the reservoir at any temperature desired. A pipe 16 extends from the reservoir through the boiler and housing and is provided with a faucet 17 for drawing off the coffee as required. The housing is provided with a cover 18 of a sufficient size to accommodate the upper extremity of the container. It will be noted that the container is tapered so that it can be disposed in supports of different cross-sectional dimensions and at the same time afford a good fit between the container and reservoir and thereby substantially prevent the escape of steam between the container and reservoir. More specifically in this respect, if the reservoir were smaller in diameter the container would take a position somewhat higher than the position shown in Figure 4, and if the reservoir were of a larger diameter, the container would nest and seat lower in the reservoir.

The strainer 2 may be made up with screen of different sized mesh. When the assembly is to be employed in connection with the cooking of commodities, such as soups, beans, rice and prunes, a strainer having a screen with approximately 100 mesh to the square inch will be used, whereas in the preparation of coffee the mesh will approximate 300 per square inch when a regular grind of coffee is used.

To utilize the assembly as shown in Figure 4, and assuming that the boiler is in operation, it is only necessary to place the desired quantity of ground coffee in the container and then pour a predetermined amount of boiling water into the container and allow the water to react on the coffee to provide a liquor which passes through the strainer onto the bottom wall of the container and into the grooves from whence it flows or drips through the center aperture 7 and holes 10 into the reservoir where it can be held to the desired temperature by the boiler. After the liquor has all been drained from the container, the container can be removed to dispose of the coffee grounds. To facilitate cleaning of the container and the strainer a tool can be inserted upwardly through a hole 19 in the rest portion 3 of the container to release the strainer from its snug fitting operative position in the container.

It has been discovered that the interior surfaces of the container has an affinity for the bitters of the coffee which collect on such surface, and consequently very little of the bitters passes through the strainer into the reservoir.

It is to be understood that when the strainer is placed in the container the screen normally assumes a substantially horizontal or planar position. However, after the coffee is placed in the container on the screen of the strainer and the device or assembly has been in operation for a short interval of time, the screen will sag and in some instances will bear against those portions of the concave or conical bottom wall between or intermedate the grooves 5. This bearing relationship between the screen and portions of the bottom wall of the container serves in some measure to retard or delay the flow of the liquor to the outlet aperture 7 and at the same time gives the hot water a longer period of time to react on the grounds of the coffee so that the full value of the coffee is obtained, after which the liquor is free to flow down the grooves to the outlet aperture.

When commodities such as soups, stews, prunes and rice are prepared, the container 1 with the commodity therein is placed in a container or vessel such as the pitcher 9 as shown in Figure 5 and water can be poured into either the pitcher or into the container so that the commodity can be cooked by placing the pitcher on a stove.

In view of the foregoing, it will be manifest that the principles of design and construction embodied in the container and strainer offer advantages over the conventional cloth bag usually employed in making large quantities of liquid coffee.

Having thus described my invention, it is obvious that various modifications may be made in the same without departing from the spirit of the invention, and, therefore, I do not wish to be understood as limiting myself to the exact form, construction, arrangement, and combination of parts herein shown and described.

I claim:

1. A container for liquid comprising a cylindrical wall and a bottom wall formed with an inturned annular portion providing a rest for a strainer, said bottom wall also being formed with a round dished portion offset and depending from the annular portion, said dished portion having a centrally disposed pocket provided with a free outlet port for a liquid, said dished portion also having a plurality of radially extending channel formations leading to the pocket, at least one of said formations being provided with an aperture spaced outwardly from the port through which a liquid may pass, and a strainer mounted on said rest.

2. A container for liquid comprising a tapered cylindrical side wall and a bottom wall formed with an inturned annular portion providing a rest for a strainer, said bottom wall also including a round dished portion offset and depending from the annular portion, said dished portion having a centrally disposed pocket provided with a free outlet port for a liquid, said dished portion also having a plurality of radially extending relatively shallow channel formations leading to the pocket, the base portion of each channel formation being provided with an aperture through which liquid may pass, and a strainer overlying the outlet port and having an annular ring portion disposed on the annular seat portion of the container and frictionally engaging the side wall of the container.

3. The structure defined in claim 2, in which the annular portion of the container is provided with an opening through which a tool may be inserted for engagement with the ring of the strainer to lift the latter.

References Cited in the file of this patent

UNITED STATES PATENTS

| | | |
|---|---|---|
| 960,419 | Selg | June 7, 1910 |
| 1,108,288 | Watson | Aug. 25, 1914 |
| 1,570,807 | Watson | Jan. 26, 1926 |
| 1,803,356 | Richheimer | May 5, 1931 |
| 1,816,994 | Armstrong | Aug. 4, 1931 |
| 1,831,923 | Meyer | Nov. 17, 1931 |
| 1,882,247 | Levings | Oct. 11, 1932 |

FOREIGN PATENTS

| | | |
|---|---|---|
| 378,696 | Great Britain | Aug. 18, 1932 |